United States Patent [19]
Drutchas et al.

[11] 3,873,165
[45] Mar. 25, 1975

[54] TORQUE EQUILIBRIUM SKID CONTROL SYSTEM EMPLOYING A POWER SOURCE INDEPENDENT OF WHEEL SPEED

[75] Inventors: Gilbert H. Drutchas, Birmingham, Mich.; Garrett D. Shaw, Palos Verdes Peninsula, Calif.

[73] Assignee: TRW Inc., Cleveland, Ohio

[22] Filed: Nov. 28, 1972

[21] Appl. No.: 310,136

[52] U.S. Cl. ............... 303/21 F, 188/181 A, 303/10
[51] Int. Cl. ............................................. B60t 8/12
[58] Field of Search ............... 303/21, 61–63, 303/68–69, 6, 10; 188/181

[56] References Cited
UNITED STATES PATENTS

| | | | |
|---|---|---|---|
| 3,539,227 | 11/1970 | Drutchas et al. | 303/21 F |
| 3,588,191 | 6/1971 | Atkin et al. | 303/21 F |
| 3,588,193 | 6/1971 | Drutchas | 303/21 F |
| 3,675,422 | 7/1972 | Drutchas et al. | 303/21 F |
| 3,707,312 | 12/1972 | Drutchas et al. | 188/181 C |

Primary Examiner—Trygve M. Blix
Assistant Examiner—D. C. Bulter
Attorney, Agent, or Firm—Hill, Gross, Simpson, Van Santen, Steadman, Chiara & Simpson

[57] ABSTRACT

A pump driven independently of vehicle wheel speed has its output modified by a separate valving an assembly regulated as a function of vehicle wheel speed to provide a speed-feed hydraulic input for use in a method and apparatus of skid control in a wheeled vehicle based on an operational principle of extremal control and wherein the decel bias applied to the wheels is maintained at a level below that necessary to lock the wheels, thereby seeking the peak of the coefficient of friction-slip curve.

6 Claims, 4 Drawing Figures

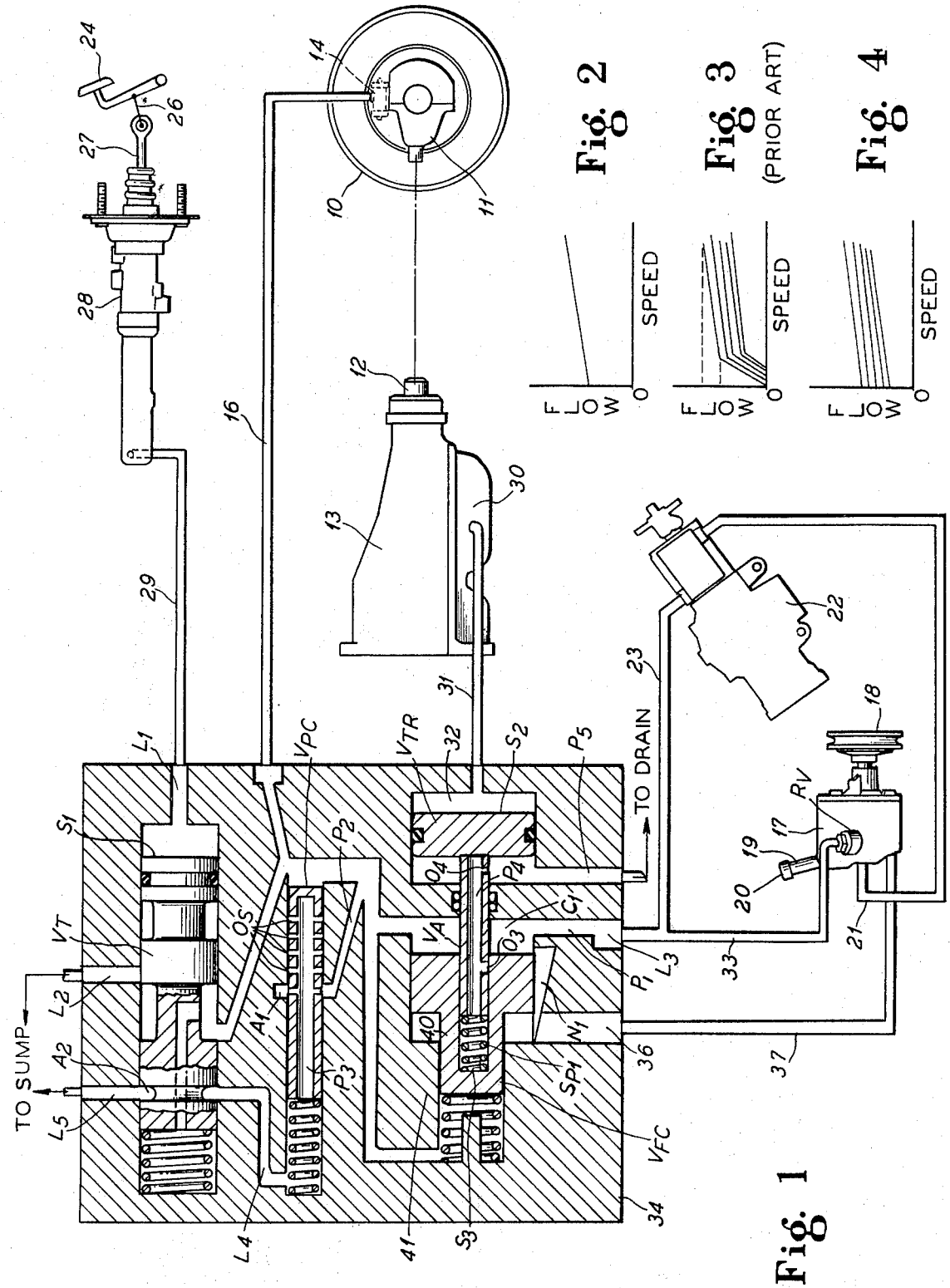

TORQUE EQUILIBRIUM SKID CONTROL SYSTEM EMPLOYING A POWER SOURCE INDEPENDENT OF WHEEL SPEED

BACKGROUND OF THE INVENTION

1. Field of the Invention

This invention relates generally to wheeled vehicles and more particularly to a skid control system for a vehicle.

2. The Prior Art

The prior art is represented by U.S. Pat. No. 3,588,193 which discloses a method and means of skid control in a wheeled vehicle based on an operational principle of extremal control. However, in that disclosure as well as in other forms of antiskid systems, the arrangement contemplates the utilization of a wheel-driven pump driven as a function of the rotational rate of speed of the wheels.

SUMMARY OF THE PRESENT INVENTION

In accordance with the principles of the present invention, there is provided a pump which is driven independently of the speed of the vehicle. For example, a power steering pump driven off the fan belt of the vehicle engine may be utilized and supplies a hydraulic input to a closed hydraulic circuit. The output of such a pump is modified by a valving means comprising in combination a flow control valve, an actuator valve and a transducer valve responsive to a speed signal generated by a governor speed source, a wheel speed pump, or any other suitable hydraulic or mechanical speed signal.

The transducer valve and the actuator valve move in unison and operate to provide a pressure force against the flow control valve, thereby modifying the output of the power steering pump so that it produces an output flow with a rising pressure characteristic suitable for use as a speedfeed input for subsequent utilization in a skid control system.

BRIEF DESCRIPTION OF THE DRAWINGS

FIG. 1 is a somewhat schematic plumbing diagram and illustrates general constructional features of the pump and valve combinations contemplated by the torque equilibrium skid control system of the present invention.

FIG. 2 is a characteristic curve illustrating a relationship in a hydraulic circuit where flow pressure rises with speed above engine idle.

FIG. 3 is a flow pressure matrix similar to that produced in the acknowledged prior art U.S. Pat. No. 3,588,193.

FIG. 4 is a rising pressure characteristic showing the characteristic curves occurring in the system of the present invention wherein pump flow does not fall below a minimum determined by the engine idle speed in the normal operation of the vehicle.

DESCRIPTION OF THE PREFERRED EMBODIMENTS

The basic operational principle of the skid control system disclosed herein is similar to that disclosed and claimed in U.S. Pat. No 3,588,193 in that the operational principle is one of external control, reaching a near torque equilibrium between brake torque and surface torque at the maximum (extremal) value of surface torque. Thus, the system of the present invention constantly seeks the peak of the $\mu$ (coefficient of friction)-slip curve by modulating pressure towards critical slip. By utilizing this control from surface torque, significant advantages compared to mere slip control are afforded. For example, an immediate response to the key initial conditions of a stop-road surface condition is effected. There is also inherent system response to major conditions such as vehicle load distribution, vehicle tire conditions and degraded brakes. Such conditions are variables that manifest themselves in the development of the torque which the system tends to put in equilibrium. There is no need with the present system to input vehicle speed to the control system since torque is the essential system input. Further, there is no need to input the shape and magnitude of the tire-road coefficient of friction versus slip curve. There is full time component operation during normal braking which enhances system readiness confidence level when a panic stop mode arises. The amplitude of the pressure cycling when it occurs, is such that there are no effects perceptible to the operator.

As shown in FIG. 1, the system is used with a wheeled vehicle having an appropriate number of wheels, one of which is shown at 10 driven through a differential 11 by a propeller shaft 12 rotatably driven through a transmission 13 connected to an engine not shown. The wheels of the vehicle have appropriate brake motors which can either comprise brake drums or disks, but, in any event, the brake motors can be of the type represented by the brake motor shown at 14 and provided with a hydraulic conduit 16.

In accordance with the principles of the present invention, a hydraulic power source is provided which constitutes a pump rotatably driven independent of vehicle wheel speed. Such a pump can conveniently comprise a power steering pump such as the power steering pump depicted at 17 driven by a pulley wheel 18 which may be rotatably driven by a fan belt connected to the engine drive of the vehicle. The power steering pump 17 has associated therewith an oil reservoir and a filling tube 19 closed by a cap 20 is provided so that a supply of hydraulic fluid may be replenished into the system through the filling tube 19 as needed.

The power steering pump 17 has an outlet connected to a discharge conduit 21 leading to a steering gear 22. From the steering gear 22 there is a conduit 23 through which the fluid is directed.

An operator-actuated brake pedal is shown at 24 and is drivingly connected as at 26 to a plunger 27 forming a part of a master brake cylinder 28 which delivers hydraulic pressure to a conduit 29. While any suitable hydraulic or mechanical speed signal generating means can be utilized in accordance with the principles of the present invention, there is shown by way of exemplary disclosure an automatic transmission governor source 30 which delivers a speed signal in the form of hydraulic pressure through a conduit 31.

As noted hereinabove, the present invention represents a means of utilizing the torque equilibrium principle disclosed in U.S. Pat. 3,588,193 while utilizing a power source indepnedent of wheel speed. Thus, in conjunction with the elements thus far described, all of which are common to many braking systems, the basic elements of the present invention comprise a pressure-compensating valve shown at $V_{pc}$, a throttle valve shown at $V_t$ and a differential flow control valve $V_{fc}$ augmented by a transducer valve $V_{tr}$ and a sleeve-type actuator valve $V_a$.

The transducer valve $V_{tr}$ has a motive surface $S_2$ forming one wall of a pressure chamber 32 and such valve is coupled to the hydraulic speed signal emanating from the automatic transmission governor source 30 by the conduit 31.

A separate relief valve $R_v$ is provided on the power steering pump 17 and the relief valve is connected by a conduit 33 to a flow loop including the conduit 23 so that the steering gear 22 may be bypassed to the skid control valve body 34 in the event of a flow blockage in the steering gear 22. It may be noted that when a separate power source in lieu of the power steering pump 17 is utilized, such a relief valve $R_v$ would not be required.

The Flow Circuit Operation

As the driver applies the brake in a panic mode by depressing the brake pedal 24 with maximum operator-exerted pressure, the pressure builing up in the rear of the master cylinder section is transmitted through the conduit 29 to a line $L_1$ in the skid control valve body 34. Such pressure is then transmitted to the fore of the throttle valve $V_t$ and exerts pressure against a motive surface formed on the throttle valve indicated at $S_1$.

The flow developing from the power steering pump 17 travels through the steering gear 22 and is delivered through the conduit 23 to a line $L_3$ to a passage $P_1$, both formed in the skid control valve body 34 whence the fluid is delivered to a cavity $C_1$ and through a passage $P_2$ to an annulus $A_1$ surrounding the pressure control valve $V_{pc}$. The fluid then passes through the orifices $O_s$ formed in a longitudinal row in the pressure control valve $V_{pc}$ and passes through a center passage of such valve indicated at $P_3$ to a passage $L_4$, around a throttle valve annulus indicated at $A_2$ finally metering out through a line $L_5$ to the sump indicated by legend.

The System Action

The flow of fluid coursing through the passage $P_1$ enters the cavity $C_1$. The speed signal acting on the surface $S_2$ of the transducer valve $V_{tr}$ creates a force that acts on the actuator valve $V_a$, thereby compressing a spring $SP_1$ and imparting a force to the flow control valve $V_{fc}$ via a reaction surface $S_3$ so that the flow control valve $V_{fc}$ will move and thereby open a notch-like configuration $N_1$. As a result, a recirculating bypass flow is regulated by the flow control valve $V_{fc}$ through the notch $N_1$ and a recess 36 leading to a conduit 37 constituting a return line to the power steering pump 17.

The actuator valve $V_a$ constitutes a sleeve-type valve which controls a leakage loop including an orifice $O_3$, an internal passage $P_4$ and an orifice $O_4$ leading to a passage $P_5$ connected to drain as indicated by legend.

As a result of the action of the flow control valve $V_{fc}$, the output flow of the power steering pump 17 is modified and such flow as manifested in the cavity $C_1$ produces a characteristic curve shown in FIG. 2 wherein is depicted a curve plotting flow against wheel speed and which curve exhibits a characteristic where the flow rises with speed. Accordingly, the output flow becomes a speed-feed input into the pressure control valve $V_{pc}$. The rising flow characteristic shown in FIG. 4 acts in a manner similar to the conventional flow control valve used in U.S. Pat. No. 3,588,193, which acts to produce a flow speed matrix as shown in FIG. 3. The major difference between the two characteristic curves, FIG. 3 versus FIG. 4, is the former flow goes to zero since its drive is through the wheel-driven pump, while in FIG. 4 the minimum speed does not fall below the engine idle speed.

It will be appreciated, therefore, that the present invention contemplates that the characteristic of the power steering pump flow emanating from the power steering pump 17 is modified by the position or bias of the spool 40 of the flow control valve $V_{fc}$ moving in the valve body 41 of the flow control valve $V_{fc}$ and such position of the spool is in turn determined by the transducer valve $V_{tr}$ pressure force that constitutes a signal of either the wheel speed or the propeller shaft speed.

In a classic panic stop, as described in the flow circuit operation, the following functional mode results: as the master cylinder pressure rises and closes the throttle bypass, indicated at $L_2$, flow is diverted to the pressure-compensating valve $V_{pc}$. The system pressure rises due to the closing of the pressure-compensating valve orifices $O_s$. Consequently, a higher braking pressure will be manifested upon delivery of fluid from the cavity $C_1$ into the conduit 16 leading to the braking motor 14. The actuator valve $V_a$ follows the transducer valve $V_{tr}$ to the right, using the orientation of FIG. 1. Since the flow control valve $V_{fc}$ incrementally lags the actuator valve $V_a$ in moving to the right, the actuator valve $V_a$ opens a leakage loop, orifice $O_3$, passage $P_4$, orifice $O_4$, and passage $P_5$ to drain. This results in an instantaneous drop-off of flow through the pressure-compensating valve $V_{pc}$, with a drop in the pressure at the brakes through the conduit 16. This effect causes the wheel speed to rise. The speed-sensitive transducer valve reacting to governor pressure rise then moves to the left also carrying the actuator valve $V_a$ to the left, while simultaneously closing the valve actuator orifice hole $O_3$. The response is a rising pressure mode which becomes part of the next torque equilibrium seeking cycle.

Although minor modifications might be suggested by those versed in the art, it should be understood that we wish to embody within the scope of the patent warranted hereon all such modifications as reasonably and properly come within the scope of our contribution to the art.

We claim as our invention:

1. The method of programming wheel deceleration of a wheeled vehicle which includes the steps of:

driving a supply of liquid through a closed circuit in the form of a stream, at one point in the circuit pressurizing the liquid independently of vehicle wheel speed, generating a wheel speed signal, at a second point in the circuit controlling the flow of the stream in the circuit as a function of variations in the wheel speed signal, thereby to produce a flow characteristic in the circuit downstream of said second point wherein the flow pressure rises with speed, at a third point in the circuit selectively applying a deceleration bias to the wheels of the vehicle as a function of said downstream flow characteristic, at a fourth point in the circuit throttling said downstream flow characteristic as a function of an operator-supplied input signal, and at a fifth point in the circuit between said third and fourth points metering out pressurized liquid from the circuit as a function of pressure to maintain a constant flow pressure at said third point, so that said deceleration bias is maintained at a level below that necessary to lock the wheels thereby seeking the peak of the coefficient of friction-slip curve.

2. In a vehicular hydraulic skid control comprising conduit means forming a hydraulic circuit,
  a pump for generating a hydraulic input to said circuit and being operable independent of wheel speed,
  a means for generating a speed signal which is a function of wheel speed,
  a valving means responsive to said speed signal to convert said hydraulic input into a speed-feed input, and
  means for utilizing said speed-feed input for a skid control system of the type operable on the principle of extremal control,
  said pump comprising a power steering pump driven by the engine of the vehicle,
said valving means comprising, in combination,
  a flow control valve,
  an actuator valve, and
  a transducer valve,
  said flow control valve comprising a valve body and a valve spool regulating a bypass for the hydraulic circuit,
  said actuator valve comprising a sleeve movable in a bore formed in said valve spool of said flow control valve and controlling a leakage loop returning to the input portion of the circuit,
thereby to selectively regulate the application of a pressure force against said valve spool of said flow control valve,
  said transducer valve connected to said actuator valve and having a motive surface subject to a pressure force constituting a speed signal.

3. A torque equilibrium skid control system for a wheeled vehicle comprising,
  hydraulic means forming a closed circuit,
  a rotatable pump at one point in said circuit for pressurizing the liquid and driving the liquid through said circuit in the form of a stream,
  means for rotatably driving said pump independently of vehicle wheel speed,
  speed signal means responsive to the vehicle wheel speed for generating a wheel speed signal,
  flow control means in said circuit downstream of said pump and having a transducer valve responsive to said wheel speed signal for regulating the flow of the stream in said circuit as a function of variations in the wheel speed,
thereby to produce a downstream flow control characteristic in said circuit wherein the flow pressure rises with speed,
  brake motor means connected to said circuit and operable on the vehicle wheels for applying a deceleration bias to the vehicle wheels as a function of said downstream flow characteristic,
  said flow control means further comprising a throttle valve for throttling said downstream flow characteristic as a function of an operator-supplied input signal,
  and said flow control means having a pressure control valve between said transducer valve and said throttling valve for metering out pressurized liquid from the circuit to said brake motors as a function of pressure to maintain a constant flow pressure so that deceleration bias is maintained at a level below that necessary to lock the wheels,
thereby seeking the peak of the coefficient of friction-slip curve.

4. A torque equilibrium skid control system as defined in claim 3, said speed signal means comprising an automatic transmission governor developing a hydraulic pressure signal for regulating the operation of said transducer valve as a function of wheel speed.

5. An hydraulic skid control for a wheeled vehicle operable on the principle of extremal control comprising,
  means forming an hydraulic circuit,
  hydraulic braking means in said circuit for applying a deceleration bias to the wheels of a vehicle,
  a pump for generating hydraulic input to said circuit,
  means for driving said pump independently of vehicle wheel speed,
  and control means for suppressing the deceleration bias with a controlled percent of wheel slippage to reach a near torque equilibrium between brake torque and surface torque at the extremal value of surface torque,
  said control means comprising a differential flow-responsive bypass valve for reducing said hydraulic input as a function of flow,
  said control means further comprising a transducer valve,
  a wheel speed signal source for supplying a wheel speed signal to said transducer valve,
  and an actuator valve connected to said transducer valve and movable thereby in response to variations in vehicle wheel speed,
whereby the flow control of said control means will have a downstream flow control characteristic in said circuit wherein the flow pressure rises with speed,
  and a pressure-compensating valve for metering out said hydraulic input as a function of pressure, thereby to seek the peak of the $\mu$-slip curve.

6. An hydraulic skid control as defined in claim 5 and further characterized by said pump comprising a vehicle power steering pump.

* * * * *